Nov. 2, 1926.

W. A. O'BANNON 1,605,853

SAFETY CONNECTING LINK

Filed May 11, 1926 2 Sheets-Sheet 1

Inventor
W. A. O'Bannon

By Robb, Robb & Hill
Attorneys

Nov. 2, 1926.                W. A. O'BANNON                1,605,853
                         SAFETY CONNECTING LINK
                           Filed May 11, 1926              2 Sheets-Sheet 2
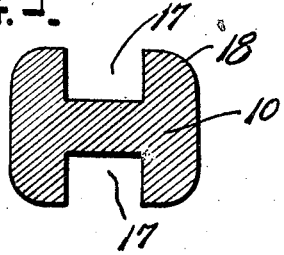
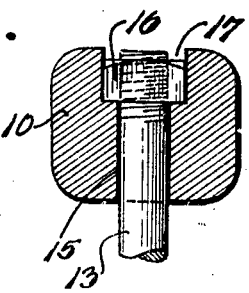
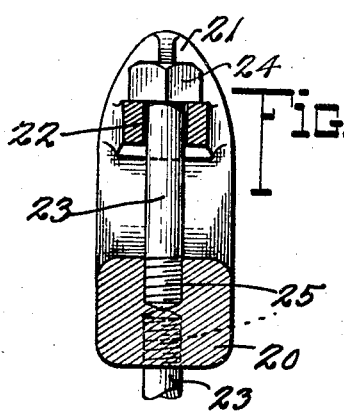
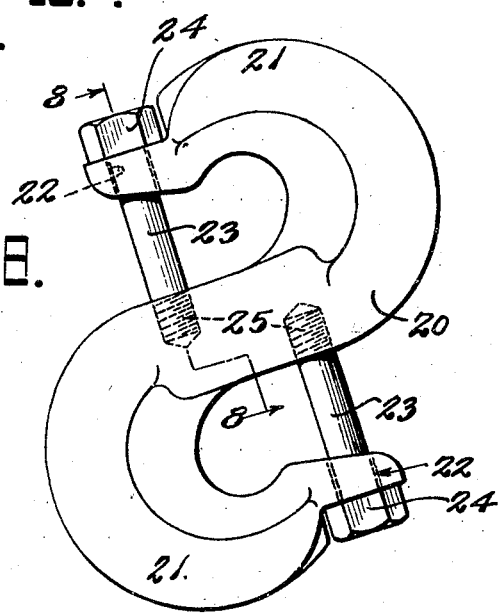
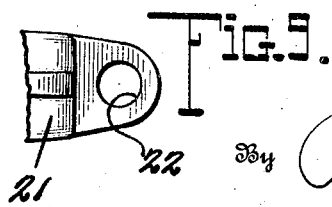
Inventor
W. A. O'Bannon
By Robb & Robb Hill
Attorneys Patented Nov. 2, 1926.

1,605,853

UNITED STATES PATENT OFFICE.

WALTER A. O'BANNON, OF TULSA, OKLAHOMA.

SAFETY CONNECTING LINK.

Application filed May 11, 1926. Serial No. 108,361.

This invention relates to a safety connecting link, and particularly to a construction adapted for application in oil well operations, such as the attachment of the looped end of a cable to a sucker rod hook.

In this class of links the opposite open bills of the hooked ends have been closed by a single bolt extending across the same. To connect or disconnect either bill of the link from an object it was necessary to remove the bolt and its nut, which required time and incurred the liability of loss of parts. In such a construction the opposite bills of the link cannot be opened independently and the closing device retained in position upon the link for subsequent operation.

In links of this character it is frequently desirable to disconnect one of the bills while retaining the other in closed position, for instance where the link remains in attachment to the sucker rod hook and is removed from a cable when its positions of use are to be changed. To obviate these objections it is important to provide a link having its opposite hook bills provided with closure means mounted thereon and independently operable into and out of engagement with the free ends of such bills.

The invention has for an object to provide a novel and improved construction wherein the connecting link is provided with bills at its opposite ends and closure means mounted upon the bills and body of the link to be independently operable so as to permit connection and disconnection of either bill.

A further object of the invention is to provide a construction of link wherein the closure means for the bill is mounted for movement laterally out of engagement with the bill and without removal from the link so as to permit the connection of the link with an object and the subsequent replacement of the closure means in engagement with the parts.

Another object of the invention is to provide an improved construction of link in which the bill is provided with a bifurcated free end which cooperates with a nut and bolt removably engaging said end and having one member adapted to be retained against rotation so as to permit sufficient loosening of the bolt to effect a lateral swinging movement out of engagement with the bifurcated end of the bill.

Other objects and advantages of the invention will be hereinafter set forth and the novel features thereof defined by the appended claims.

In the accompanying drawings:

Figure 5 is a similar view on the line 5—5 of Figure 2;

Figure 6 is a detail section on the line 6—6 of Figure 2;

Figure 7 is a side elevation of a modified form of the invention;

Figure 8 is a section on line 8—8 of Figure 7; and

Figure 9 is a detail of the bill lug.

Like reference characters designate corresponding parts throughout the several figures of the drawing.

Figure 1:
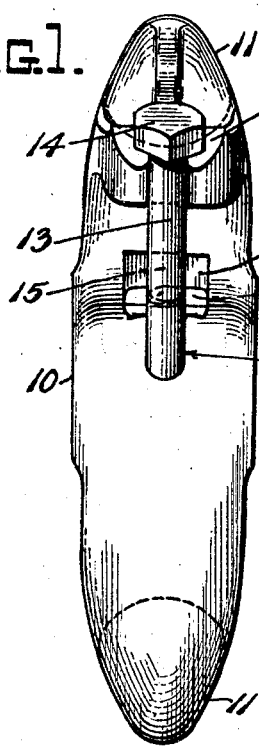
Figure 1 is an end elevation of the invention.

In the application of the invention shown the link is of substantially S-shape but may be of any desired form and configuration. The body 10 thereof is formed at opposite ends with the hooks or bills 11 which at their free ends are formed with a bifurcated lug 12 providing a slot to receive the bolt 13, the head 14 of which rests upon the outer face of the lugs 12. The opposite end of this bolt is passed through a slot 15 formed in the body 10 and has threaded thereon a nut 16. This nut lies in a recess 17 having angular walls to prevent rotation of the nut so that if the head 14 of the bolt is rotated the nut will be fed thereon sufficiently to loosen its clamping engagement and permit the bolt to be swung laterally in the slot for disengagement of the head from the bifurcated lug. This constitutes in effect a substantial pivoting movement of the bolt.

The parts just described are duplicated for the opposite bills and consequently the slots 15 and recesses 17 are disposed at opposite faces of the body 10 of the link.

Figure 2:
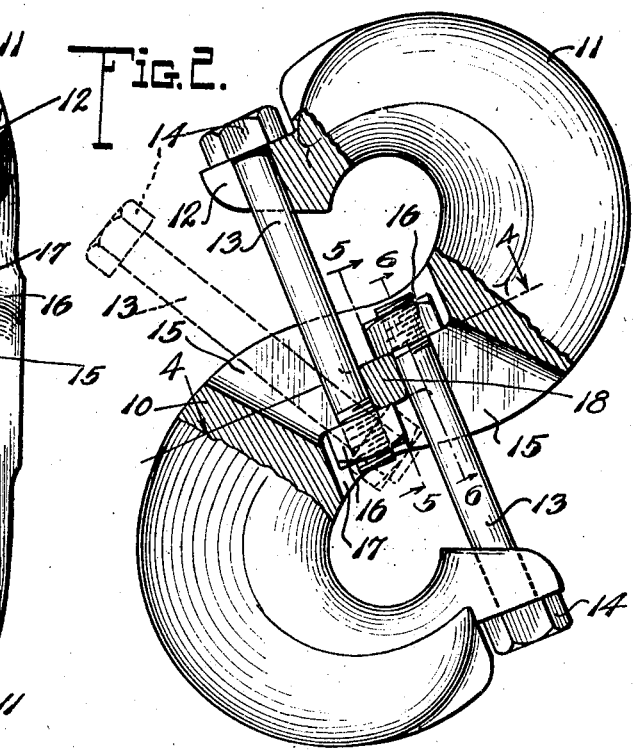
Figure 2 is a side elevation thereof with parts in section.
Figure 4:
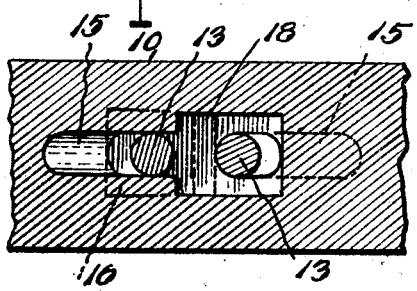
Figure 4 is a section on the line 4—4 of Figure 2.
Figure 3:
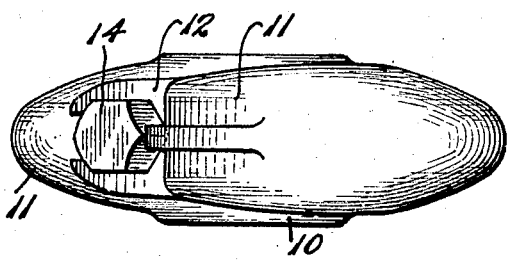
Figure 3 is a top plan.

It will also be obvious that the bolt 13 may be reversed in position so that the head is held against rotation by the angular walls of the recess and the nut may be rotated at the bifurcated lug for the purpose of releasing the bolt for movement therefrom. Such a construction does not require the removal of the nut as it is only fed upon the bolt for a sufficient distance to permit a lateral swinging movement thereof as indicated by dotted lines in Figure 2.

In the use of a plurality of closure bolts such as shown the specific structure of the body of the link embodies a bridge wall 18 from which the slots 15 extend at opposite faces of the link and merge into the angular recesses in alignment therewith. This permits the location of the bolts in substantially parallel planes but independently operable in opposite directions from said bridge wall.

In Figures 7, 8 and 9 a modified form of the invention is shown embodying the independent closing means for the bills in which the body 20 of the link is formed with oppositely disposed bills 21 having at their free ends apertured lugs 22 which in this form of the invention are not bifurcated. These lugs receive the bolt 23 with its head 24 in engagement therewith and the opposite end of the bolt threaded into a socket 25 in the body 20 in the link. This provides for a threaded engagement of the bolts with the body of the link to permit their independent disconnection therefrom.

The operation of the invention will be apparent from the foregoing description from which it will be seen that either of the closing means may be sufficiently released or loosened to permit a lateral movement thereof out of engagement with the bifurcated lug upon the bill and without detachment of the nut from the bolt, while after the application of the link to the object desired the bolt is swung back into engagement with said lug and tightened to form a rigid and effective closure. Such a construction does not require any longitudinal displacement of the bolt and it is always retained in position for immediate connection and disconnection to permit one end of the link to be opened while the other is retained in closed position.

While the construction of the link and bolts has been sufficiently shown and described, the invention is not confined thereto as it will be obvious that changes and alterations may be made therein without departing from the spirit of the invention, such as the reversal of the bolt in position or the application of the bolt to only one bill of a link.

Having thus described my invention, what I claim as new and desire to secure by Letters Patent is:

1. A connecting link having at its opposite ends hook bills one of which is adapted to form a fixed connection and the other opened to receive an object to be attached thereto, and closure members for said bills mounted upon the body of the link intermediate the bills to rigidly engage the same and independently operable out of engagement therewith.

2. A connecting link having at its opposite ends hook bills, and closure members therefor mounted upon the body of the link intermediate the bills to rigidly engage the same and independently operable out of engagement therewith by a lateral movement of the closure means from the free end of the bills.

3. A connecting link having at its opposite ends hook bills, and closure members therefore mounted upon the bills and independently operable out of engagement therewith by a lateral swinging movement of the closure means upon the link intermediate its bills and adapted by an axial movement to rigidly engage the free end of the bills.

4. A connecting link having a bill at its free end with a bifurcated portion, and a bolt having a head engaging said portion and a threaded connection with the body of the link.

5. A connecting link having its body provided with a slotted portion, a bill extended therefrom with a bifurcated lug at its free end, a bolt and nut member mounted in said lug and movably mounted in the slotted portion of the body and means for retaining one element of the bolt and nut member against rotation.

6. A connecting link having its body provided with a slotted portion, a bill extended therefrom with a bifurcated lug at its free end, and a bolt and nut member mounted in said lug and movably mounted in the slotted portion of the body, said body being provided with a recess having walls to retain the portion of the bolt and nut member in engagement therewith against rotation.

7. A connecting link comprising a body having a slotted portion and a communicating recess with angular walls, a bill extended from said body and formed with a bifurcated free end, a bolt member mounted in said end and having angular portions held against rotation by the walls of said recess and adapted to permit a lateral swinging of the bolt in the slot of the body.

8. A connecting link having a body provided with a slotted portion and an angular recess communicating therewith, a bill extended from said body and formed with a bifurcated lug at its free end, a bolt member having its head in engagement with said bifurcated portion, and a nut threaded upon the bolt and disposed within the angular recess to be retained against rotation thereby.

9. As an article of manufacture, a connecting link having its body formed with a bridge wall, and slots with angular recesses communicating therewith at opposite sides of said wall, oppositely disposed bills extending from said body and formed at their free ends with bifurcated lugs, and bolt members disposed within said lugs and having at their opposite ends a nut engaging the angular walls of the recesses of the body.

10. A connecting link having at opposite ends hook bills, and independent closure means for said bills supported upon the link intermediate the bills and adapted to be separately operated by an axial movement to engage the bills.

11. A connecting link having at opposite ends hook bills with lugs, and independent closure means extending from said lugs and adjustable upon the body of the link intermediate the bills.

12. A connecting link having at opposite ends hook bills with apertured lugs, and independent closure bolts extended through said lugs and having threaded engagement with a retaining body upon the link intermediate the bills.

In testimony whereof I affix my signature.

WALTER A. O'BANNON.